Aug. 17, 1948.  O. C. NORTON ET AL  2,447,425
DISPOSAL OF REFUSE
Filed March 17, 1945

Orlo Clair Norton
Adolf E. Hohn
INVENTOR.

BY

Patented Aug. 17, 1948

2,447,425

UNITED STATES PATENT OFFICE 2,447,425

DISPOSAL OF REFUSE

Orlo Clair Norton and Adolf E. Hahn, Erie, Pa.

Application March 17, 1945, Serial No. 583,290

3 Claims. (Cl. 210—60)

The invention relates to improvements in mixing and disposal machines by mixing and dissolving solids in fluids in which fluid under pressure is injected into a tank dispersing waste products and separating them according to their specific gravity or when dissolving solids to form a solution, fluid is injected into a tank containing solids to be dissolved, agitating and mixing materials causing rapid dissolving and retaining solids until dissolved; and the objects of the improvement are, first, to provide a safe and inexpensive method for the disposal of waste products that are mixed or saturated with glass, caustic acid or chemicals; second, to afford a method of separating and preventing materials from settling and caking in bottom of tank or sewer system; and, third, for the retaining and agitating a material in a tank until it enters into solution.

Figure 1:
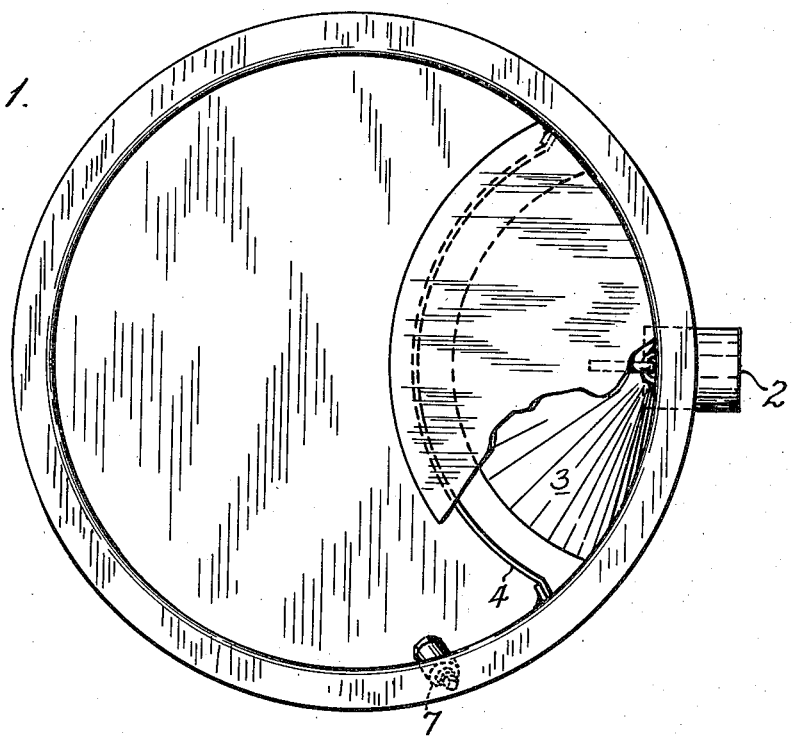
Figure 2:
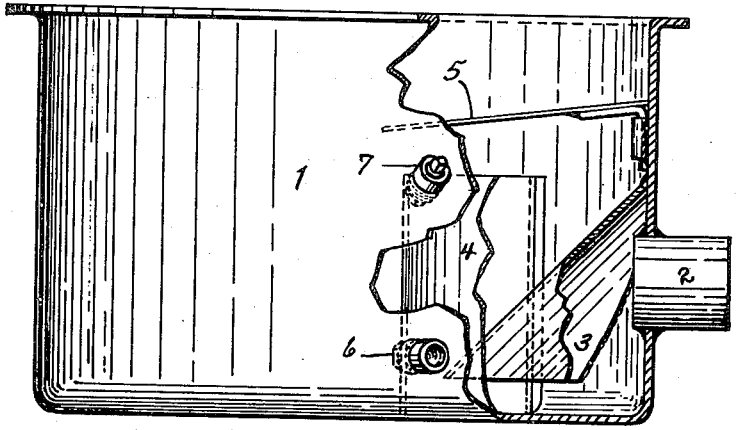

One form of the invention is illustrated in the accompanying drawing, in which Figure 1 is a top view of the machine; Figure 2, a horizontal view of the machine.

Referring now to the drawings, open tank 1, adapted to receive waste material from a bottle cleaning machine or the like, has an outlet 2 for connection to a sewer line (not shown). An angularly extending baffle 3 is secured to the inner wall of the tank 1 and is disposed above and laterally of the outlet 2 and is spaced from the bottom of the tank 1 to provide an opening underneath thereof. A removable arcuate shaped baffle 4 is spaced from the outlet 2 and the angularly extending baffle 3. The waste and water agitated in the tank 1 overflows the baffle 4 and moves underneath the baffle 3 to the outlet 2, thereby preventing any large mass of material from passing to the sewer line or from clogging the outlet 2.

When baffle 4 is removed, solution passes from lower section of tank under baffle 3 to outlet 2. Removable baffle 5 prevents material from entering directly into outlet 2. Inlet 6 is used when tank is in operation for the purpose of disposing of or mixing heavy material. Inlet 7 is used when tank is in operation for the purpose of disposing of light material that floats on surface of liquid.

In operation, our improved device is installed adjacent a bottle washer or the like so that pulp and other waste may be pushed into the tank or disposer with a minimum of labor. Water from the washing section of the bottle washer spills into the tank or disposer whereby paper, glass, or the like is trapped thus protecting the sewer system. Water lines are run at full pressure to increase agitation in the tank giving better separation with less water.

What we claim is:

1. A waste disposer comprising an open cylindrical container adapted to receive waste material having an outlet in the side thereof, a vertical baffle extending upwardly from the base of said container spaced from said outlet, a removable horizontal baffle spaced from the top side of said baffle above said outlet, an angularly extending baffle disposed over said outlet spaced from the bottom of said container, and means for agitating fluid in said container.

2. A waste disposer as set forth in claim 1 wherein said vertical baffle is removable.

3. A waste disposer comprising an open container adapted to receive waste material having an outlet, injector means for agitating the water in said container, a removable vertical baffle adjacent said outlet, a removable horizontal baffle spaced from the top side of said vertical baffle and forming an open chamber adjacent said outlet, and an angularly extending baffle spaced from the bottom of said container and extending over said outlet in said container.

ORLO CLAIR NORTON.
ADOLF E. HAHN.

REFERENCES CITED

The following references are of record in the file of this patent:

UNITED STATES PATENTS

| Number | Name | Date |
|---|---|---|
| 933,121 | Schofield | Sept. 7, 1909 |
| 1,715,438 | Travers | June 4, 1929 |
| 1,719,418 | Bennett et al. | July 2, 1929 |
| 2,136,945 | Klein | Nov. 15, 1938 |
| 2,254,761 | Swanson | Sept. 2, 1941 |
| 2,266,097 | Tolman | Dec. 16, 1941 |
| 2,277,254 | Ridge et al. | Mar. 24, 1942 |
| 2,310,270 | Zerweck | Feb. 9, 1943 |
| 2,314,977 | Green | Mar. 30, 1943 |